US009145152B2

(12) United States Patent
    Agostini

(10) Patent No.: US 9,145,152 B2
(45) Date of Patent: Sep. 29, 2015

(54) DETECTOR FOR DETECTING TRAIN WHEEL BEARING TEMPERATURE

(75) Inventor: Alessandro Agostini, Florence (IT)

(73) Assignee: Progress Rail Inspection & Information Systems S.r.l., Bologna (IT)

( * ) Notice: Subject to any disclaimer, the term of this patent is extended or adjusted under 35 U.S.C. 154(b) by 704 days.

(21) Appl. No.: 13/365,327

(22) Filed: Feb. 3, 2012

(65) Prior Publication Data

US 2013/0032674 A1    Feb. 7, 2013

(30) Foreign Application Priority Data

Feb. 4, 2011    (EP) .................................... 11153382

(51) Int. Cl.
    *B61K 9/04*      (2006.01)
    *B61K 9/06*      (2006.01)
    *G01J 5/00*      (2006.01)
    *G01J 5/08*      (2006.01)

(52) U.S. Cl.
    CPC ................ *B61K 9/06* (2013.01); *G01J 5/0022* (2013.01); *G01J 5/0809* (2013.01); *G01J 2005/0077* (2013.01); *G01J 2005/0081* (2013.01)

(58) Field of Classification Search
    CPC ........................................................ B61K 9/04

USPC ................... 246/167 R, 169 R, 169 A, 169 D
See application file for complete search history.

(56) References Cited

U.S. PATENT DOCUMENTS

| 3,545,005 | A  | * | 12/1970 | Gallagher ................. 246/169 D |
| 7,946,537 | B2 | * | 5/2011  | Mathews et al. .......... 246/169 A |
| 8,439,315 | B2 | * | 5/2013  | Kilian et al. .............. 246/167 R |
| 8,649,932 | B2 | * | 2/2014  | Mian et al. ................. 250/316.1 |
| 2004/0075570 | A1 |   | 4/2004 | Bartonek |
| 2006/0131464 | A1 | * | 6/2006 | Hesser et al. ............. 246/169 D |

FOREIGN PATENT DOCUMENTS

| JP | 2006292488 | 10/2006 |
| WO | 2007080241 | 7/2007 |

* cited by examiner

*Primary Examiner* — R. J. McCarry, Jr.
*Assistant Examiner* — Jean Charleston
(74) *Attorney, Agent, or Firm* — Miller, Matthias & Hull LLP

(57) ABSTRACT

A detector for detecting a condition of a rail vehicle undercarriage component including a sensor with infrared sensing elements, each of the elements configured to scan regions of a target area of the rail vehicle undercarriage component. The sensor is oriented so that at least one of the elements receives unobstructed infrared emissions from the rail vehicle undercarriage component, and the sensing elements are arranged in a matrix of plurality of arrays.

17 Claims, 5 Drawing Sheets

DETECTOR FOR DETECTING TRAIN WHEEL BEARING TEMPERATURE

TECHNICAL FIELD

This disclosure generally relates to the field of rail transportation, and more particularly, to determining a temperature of train undercarriage components.

BACKGROUND

Safe and reliable operation of a railroad system may be dependent upon the integrity of the rolling mechanisms of the vehicles travelling over the rails. Worn or damaged train wheel bearings may increase the rolling friction of the axle thereby increasing the power required to pull the train. In addition worn or damaged bearings may cause excessive wear to the train axle and, in the case of failure of the bearing, may even cause the axle to lock up, preventing rotation of the wheel and thus resulting in a potential fire hazard due to the heat build up and potential sparking caused by friction of the locked wheel scraping along the rail.

Bearing temperatures may be scanned by sensing a temperature of the wheel bearing indirectly through a bearing box surrounding the wheel bearing on a rail car of a train. For example, infrared radiation (IR) sensors may be mounted along a rail to detect IR energy emitted by an outer wheel bearing of passing rail cars. The IR energy may be indicative of a temperature of the wheel bearing.

However, such a system may be limited to a certain rail car wheel configuration that allows an unimpeded sensing path from the sensor to the bearing box, which may not be achievable for all rail car wheel configurations. Furthermore, inner wheel bearings used on some rail cars and locomotives have proven difficult to scan due to sensing paths being blocked by suspension components and the differences among inner wheel bearing arrangements. In addition, the presence of heat sources near an inner bearing being scanned, such as gear boxes or suspension springs, and the effects of lateral movement of the axle bringing other heat sources into a sensing path, such as during wheel hunting may result in erroneous IR readings for the bearing.

U.S. patent publication number 2006/131,464 discloses a temperature detection system including a sensor comprising an array of infrared sensing elements. Each of the elements may be aimed at a different region of a target area of a rail vehicle undercarriage component to generate respective scanning waveform signature data corresponding to each different region. The sensor may be oriented so that at least one of the elements receives unobstructed infrared emissions from the undercarriage component of a rail vehicle passing the sensor. The system also includes a memory for storing characteristic waveform signature data corresponding to known undercarriage components and a processor for processing the scanning waveform signature data to identify a type of the rail vehicle undercarriage component being scanned and to extract information indicative of a condition of the rail vehicle undercarriage component being identified.

The infrared emission measurements may still not be representative of a condition and a relative hot maximum may not be detected.

Accordingly, an improved system, and method for sensing a temperature of train wheel bearings is desired. The present disclosure is directed, at least in part, to improving or overcoming one or more aspects of the prior art engine component support structures.

BRIEF SUMMARY OF THE INVENTION

In a first aspect, the present disclosure describes a detector for detecting a condition of a rail vehicle undercarriage component comprising a sensor comprising infrared sensing elements, each of the elements configured to scan regions of a target area of the rail vehicle undercarriage component the sensor being oriented so that at least one of the elements receives unobstructed infrared emissions from the rail vehicle undercarriage component, characterised in that the sensing elements are arranged in a matrix of plurality of arrays.

In a second aspect, the present disclosure describes a method for detecting a condition of a rail vehicle undercarriage component comprising the steps of scanning the rail vehicle undercarriage component with a sensor comprising infrared sensing elements, each of the elements scanning regions of a target area of the rail vehicle undercarriage component Characterised in that the rail vehicle undercarriage component is scanned from positions corresponding to sensing elements arranged in a matrix of plurality of arrays.

Other features and advantages of the present disclosure will be apparent from the following description of various embodiments, when read together with the accompanying drawings.

BRIEF DESCRIPTION OF THE DRAWINGS

The foregoing and other features and advantages of the present disclosure will be more fully understood from the following description of various embodiments, when read together with the accompanying drawings, in which.

DETAILED DESCRIPTION

This disclosure generally relates to rail vehicle undercarriage component temperature detectors.

Figure 1:
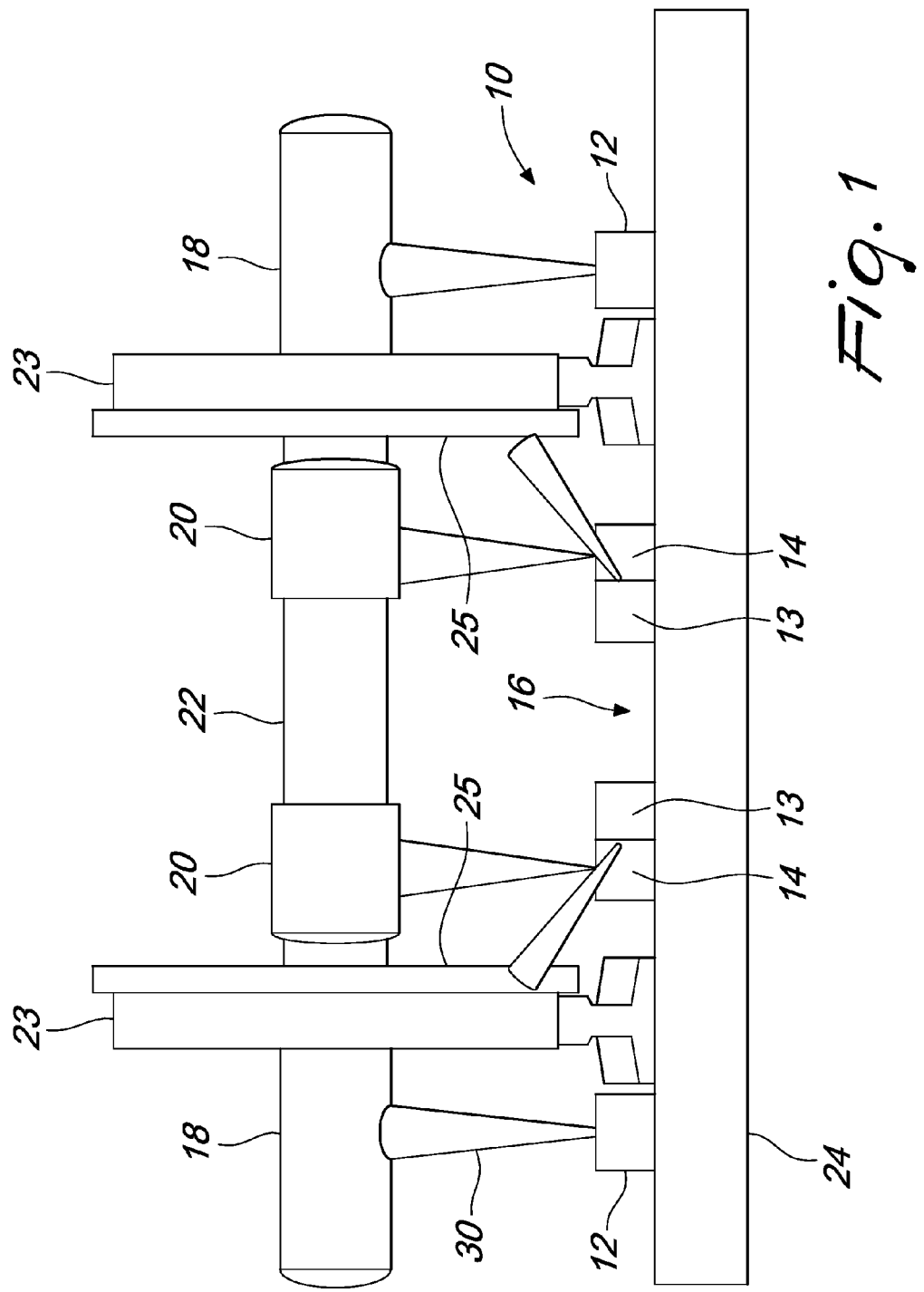
FIG. 1 is a schematic representation of rail vehicle undercarriage component temperature detector.

FIG. 1 is schematic representation of a detector 10 for detecting a temperature of a rail vehicle undercarriage component such as wheel bearings. One or more sensors, such as outer bearing sensor 12 and inner bearing sensor 14, may be placed in a position along a track 16 to obtain data from wheel bearings. The wheel bearings may be an inner bearing 20 and an outer bearing 18 of a train axle 22. The data may be obtained as the axle 22 passes the sensors 12, 14.

The sensors 12, 14 may be positioned in a rail bed of the track 16, such as within a cross tie or sleeper 24. The sleeper 24 may be adapted to contain the sensors 12, 14 for receiving IR emissions from the bearings 18, 20.

The detector 10 may comprise Wheel IR sensors 13. The wheel IR sensors 13 may be placed in a position along the track 16 to obtain IR emission data from the wheels 23, such as inner faces 25 of the wheels 23, as the axle passes the sensors 13.

In an embodiment, a portion of the train axle 22, such as an axle portion near an inner bearing 20, may be targeted by a sensor to obtain IR emission data from the axle portion.

Each sensor 12, 13, 14 may further include a plurality of infrared sensing elements. The infrared sensing elements may scan regions of a target area of the bearings 18, 20 to generate respective scanning waveform signature data corresponding to each region. The sensors 12, 13, 14 may be oriented so that at least one of the infrared sensing elements receives unobstructed infrared emissions from the bearings 18, 20.

Figure 2:
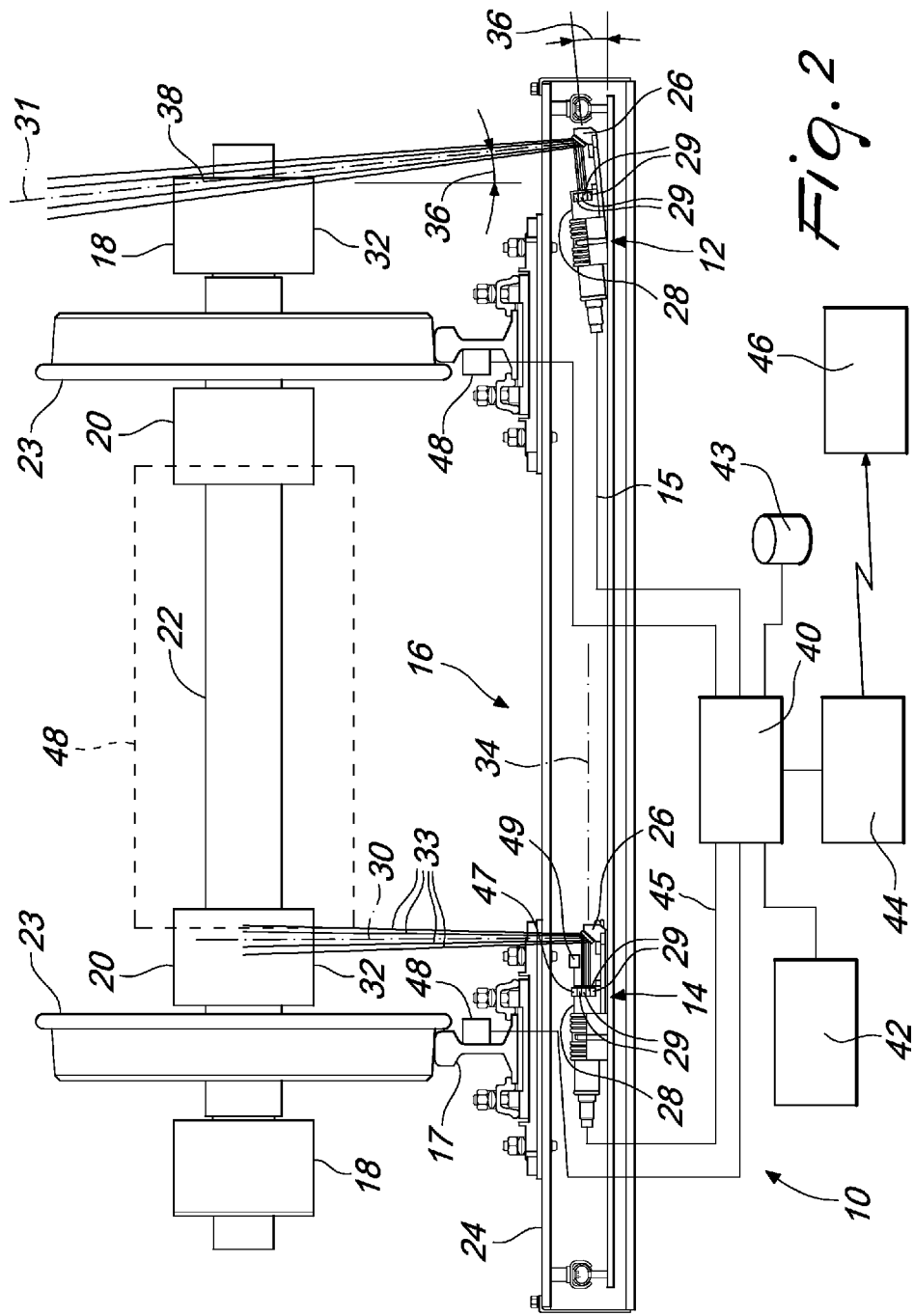
FIG. 2 is a cross sectional view of a rail vehicle undercarriage component temperature detector with a portion thereof being embedded in a metal railroad tie, or sleeper.

FIG. 2 illustrates a detector 10 embedded in a metal rail road tie or a sleeper wherein each sensor 12, 14 may further include a plurality of infrared sensing elements 29. The infrared sensing elements 29 may comprise IR radiation sensitive diode detectors or IR sensitive planar arrays having individually resolvable pixels arranged within the receiver 28. The infrared sensing elements 29 may receive IR emissions 33 radiated by respective bearings 18, 20.

In an embodiment, each sensor 12, 14 may include a mirror 26 to redirect IR emissions to a receiver 28 in the sensor 12, 14. The mirror 26 may allow the receiver 28 to be oriented substantially horizontal within the sleeper 24. The sensors 12, 14 may be positioned along an axis 34 parallel to the train axle 22 to receive IR emissions emitted from a bottom 32 of a bearing 18, 20. The sensors 12, 14 may be positioned along a path 30 perpendicular to the axle 22. The IR emissions may be redirected by the mirror 26, for example, at a right angle with respect to the path 30, into the receiver 28.

Each infrared sensing element 29 may receive a respective portion of IR energy from a target area, such as the bottom 32 or face 38 of the bearing 18, 20, which may be spaced away from portions of IR emissions received by other IR sensing elements 29 of a particular sensor.

In an embodiment, the sensors 12, 14 may include five elements 29, such as Mercury/Cadmium/Tellurium (HgCdTe) elements, positioned within the sensors 12, 14. Four elements may be used for scanning, and a fifth element 47 may be used for calibrating the other elements 29. The calibrating element 47 may be positioned to view a reference Peltier effect with semiconductor cooler 49 maintained at a desired temperature, such as −40 degrees Celsius, to provide a DC-coupled benchmark for sensed heat signatures. Such a design may allow an absolute temperature measurement accuracy of +0.1 degree Celsius. The sensors 12, 14 may comprise a zinc-selenid lens and an external shutter mounted on the instrumented tie, with a front surface mirror 26 in the viewing path. The mirror 26 may include a gold front surface to resist tarnishing or bonding with other materials. The mirror 26 may be rotated, such as at 10,000 revolutions per minute, to fling off contaminants that may come to rest on the mirror 26.

While the perpendicular orientation of the path 30 may allow the sensors 12, 14 to receive IR radiation unblocked by other components, (such as suspension components positioned near the bearings 12, 14) an unimpeded path from the bearing 18, 20 to the mirror 26 may not be possible to achieve in some cases. For example, the bottom 32 of a locomotive outer bearing 18 may be obscured, thereby rendering it difficult to maintain a clear path to the bottom 32 of the outer bearing 18 for receiving IR emissions.

In an embodiment, the outer bearing sensor 12 may be inclined from the axis 34 by an angle 36 so that an outer bearing imaging path 31 may be inclined away from perpendicular with respect to the axle 22 by corresponding angle 36. For example, the bearing imaging path 31 may be positioned at an acute angle with respect to a face 38 of the outer bearing 18. Consequently, an IR emission radiated from an un-obscured portion of the outer bearing 18, such as the face 38 of the outer bearing 18, may be sensed by the sensor 12 positioned in the railbed without interference from components positioned near the bearing 18.

The sensing elements 29 in each sensor 12, 13, 14 may be arranged in a matrix. The matrix may comprise a plurality of arrays of sensing elements 29. Each array may comprise sensing elements 29 arranged in a row.

Figure 3:
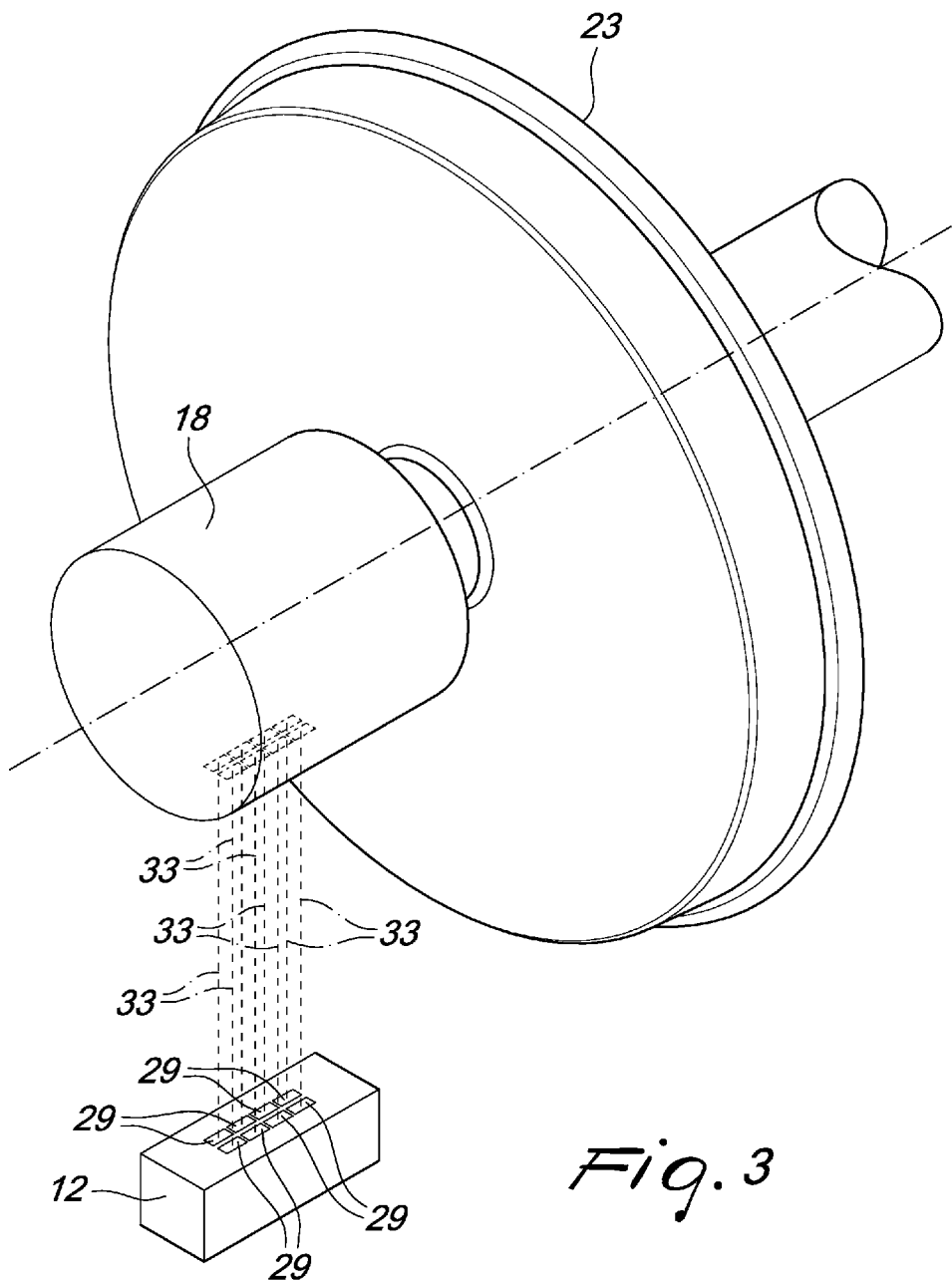
FIG. 3 is a schematic representation of a first embodiment of the detector of the present disclosure having sensing elements arranged in a matrix.

FIG. 3 illustrates a first embodiment of the detector of the present disclosure wherein the sensing elements 29 may be arranged in a matrix in each of the sensors 12, 13, 14. The matrix may comprise arrays of sensing elements 29 arranged in parallel. In an embodiment, the matrix may comprise at least two arrays of sensing elements 29 arranged in parallel.

The matrix may be arranged with the arrays in a complete overlap. In an embodiment, the axis of the overlap may be transverse to the direction of travel of the rail vehicle.

The sensing elements 29 in each array may be distributed so that the IR emissions of points along a longitudinal section of bearings 18, 20 corresponding to the position of each sensing element 29 may be detected. In an embodiment, the IR emissions along at least two longitudinal sections of bearings 18, 20 corresponding to the positions of at least two arrays may be detected.

The IR emissions from the different portions of the bearing 18, 20 along a perimetric segment may be detected by the matrix arrangement of the sensing elements 29. The different portions may be different points along a perimetric segment of the bearing 18, 20. In an embodiment, the IR measurements may be obtained at least two points along a perimetric segment with at least two sensing elements 29.

The detection of multiple IR emissions along the longitudinal sections and along the perimetric segment of the bearings 48, 20 may enable a redundancy in the IR measurements. The degree of redundancy may be correlated to the number of sensing elements positioned in the direction of travel of the rail vehicle. The redundancy in the IR measurements may increase confidence of the measurements.

Figure 4:
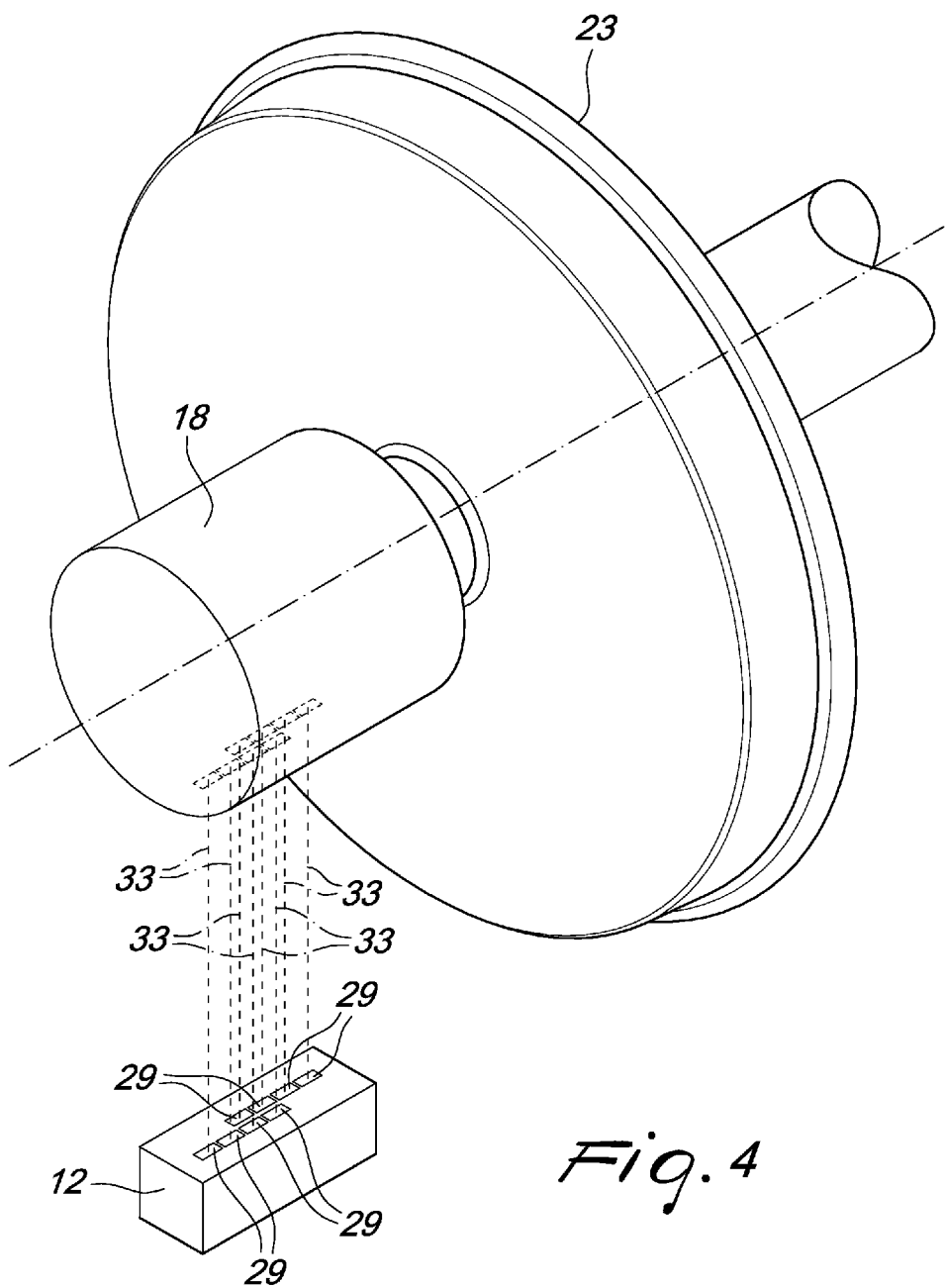
FIG. 4 is a schematic representation of a second embodiment of the detector of the present disclosure having sensing elements arranged in a matrix.

FIG. 4 illustrates a second embodiment of the detector of the present disclosure wherein the sensing elements 29 may be arranged in a matrix in each of the sensors 12, 13, 14. The matrix may comprise a plurality of arrays of sensing elements 29 arranged in parallel. In an embodiment, the matrix may comprise at least two arrays of sensing elements 29 arranged in parallel.

The matrix may be arranged with the arrays in a partial overlap. The region of overlap may correspond to the central portions of the bearings 18, 20 that are scanned. In an embodiment, the axis of overlap may be transverse to the direction of travel of the rail vehicle.

In the embodiment, each array of the matrix may comprise at least four infrared sensing elements. The overall length of the arrays may range from 700 mm to 800 mm. The overall length of the arrays may be 800 mm.

The length of the region of overlap between the arrays may range between 250 mm to 350 mm. The length of region of overlap between the two arrays may be 250 mm.

The sensing elements 29 in each array may be distributed so that the IR emissions of points along a longitudinal section of bearings 18, 20 corresponding to the position of each sensing element 29 may be detected. In an embodiment, the IR emissions along at least two longitudinal sections of bearings 18, 20 corresponding to the positions of at least two arrays may be detected. The length of the longitudinal sections of bearings 18, 20 that are scanned individually by each array may be the same. The overall length of the longitudinal sections bearings 18, 20 that are scanned by the arrays together may be greater than the length of a longitudinal section of bearings 18, 20 scanned individually by a single array.

The IR emissions from the different portions of the bearing 18, 20 along a perimetric segment may be detected by the matrix arrangement of the sensing elements 29. The different portions may be different points along a perimetric segment of the bearing 18, 20. In an embodiment, the IR measurements may be obtained at least two points along a perimetric segment with at least two sensing elements 29.

The detection of multiple IR emissions along the longitudinal sections and along the perimetric segment of the bearings 18, 20 may enable a redundancy in the IR measurements at the region of overlap. The degree of redundancy may be correlated to the number of sensing elements positioned in the direction of travel of the rail vehicle. The redundancy in the IR measurements may increase confidence of the measurements.

In a further embodiment of the detector 10, the sensing elements 29 may be arranged in a staggered matrix arrangement. In an embodiment, the sensing elements 29 may be staggered transverse to the direction of travel of the rail vehicle. The staggered arrangement may allow greater portions of the bearings 18, 20 to be scanned by the sensing elements.

In a further embodiment of the detector 10, the sensing elements 29 may be orientated such that in a plurality of arrays neighbouring sensing elements 29 scan the same point on the bearings 18, 20.

Figure 5:
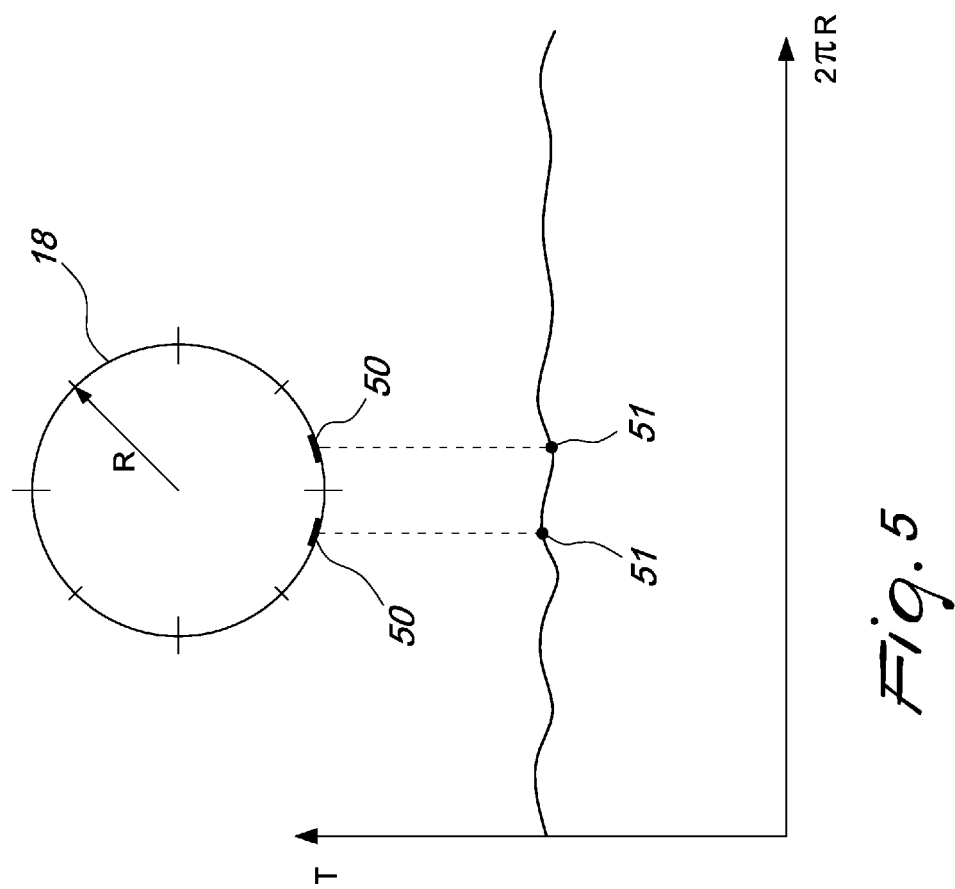
FIG. 5 is a schematic representation of cross sectional view of a rail vehicle undercarriage component with scanned regions superimposed on a Temperature vs Perimetric distance graph.

FIG. 5 illustrates cross sectional view of a rail vehicle undercarriage component, such as bearings 18 scanned by sensing elements 29 along the perimetric segment thereof. The scanned regions 50 may correspond to the positions of the respective sensing elements 29. The scanned regions may be two different points to provide a redundancy in the IR measurements.

The IR measurements from the scanned regions 50 may be represented by points on a Temperature vs Perimetric distance graph which shows that the readings are taken from different regions along a perimeter of bearing 18.

The IR emissions received may be converted into signals indicative of a strength of the IR energy received and may be sent to a processor 40. The signals may be processed, for example, to determine indications of abnormal bearing heating.

In an embodiment of the invention, the processor 40 may be disposed remotely from the sleeper 24 and may be connected to the sensors 12, 14 via respective cables 15, 45. The processor 40 may further receive wheel passage information provided by one or more wheel sensors 48 such as inductive sensors, for example, spaced longitudinally along rail 17.

The processor 40 may be in communication with a memory 42, for example, to receive analytically and/or experimentally derived radiation pattern information from the memory 42 to perform pattern recognition analysis in accordance with an aspect of the invention. The memory 42 may store characteristic waveform signature data corresponding to known undercarriage components.

The processor 40 may be in communication with the sensor 12, 13, 14 and the memory 42 for processing the scanning waveform signature data with respect to the characteristic waveform signature data stored in memory to identify a type of the rail vehicle undercarriage component being scanned and to extract information indicative of a condition of bearing 18, 20 being identified.

Processed information, such as information identifying a bearing condition of a sensed wheel bearing, may be transmitted via transmitter 44 to a central monitor 46 for reporting and/or notification of a degraded bearing condition requiring servicing.

The processor 40 may be in communication with a train database 43 having reference information for each passing vehicle to the relative axle count within the train and the relative vehicle position within the train. For example, the reference information may be downloaded from a remote source via transmitter 44 being configured as a transceiver for receiving and transmitting information. In another aspect, specific registered car number data from an external system, such as an AEI tag reader system, may be input to the database 43 to tag the vehicle data with a unique vehicle registration number.

In an embodiment, a detector 10 for detecting a condition of a rail vehicle undercarriage component 18, 20 may comprise a sensor 12, 13, 14 comprising infrared sensing elements 29, each of the elements 29 scanning regions of a target area of the rail vehicle undercarriage component 18, 20 to generate respective scanning waveform signature data corresponding to each region, the sensor being oriented so that at least one of the elements 29 receives unobstructed infrared emissions from the rail vehicle undercarriage component 18, 20, a memory 42 for storing characteristic waveform signature data corresponding to known undercarriage components, and a processor 40 in communication with the sensor 12, 13, 14 and the memory 42 for processing the scanning waveform signature data with respect to the characteristic waveform signature data stored in memory to identify a type of the rail vehicle undercarriage component being scanned and to extract information indicative of a condition of the rail vehicle undercarriage component 18, 20 being identified characterised by a matrix of elements 29 arranged in a plurality of arrays.

In an embodiment, the detector 10 may be configured for acquiring 120 samples per element 29 per bearing detected at speeds from about 2.99 km/h to 498.9 km/h. The sampling rate may be scaled to a train velocity, so that regardless of the train speed, 120 samples per element 29 per bearing measured may be captured and 240 samples per element 29 per wheel measured. Bearing temperatures up to 180 degrees Celsius may be detected and wheel temperatures up to 600 degrees Celsius may be measured with the detector 10.

In an embodiment a method for detecting a condition of a rail vehicle undercarriage component 18, 20 may comprise the steps of scanning the rail vehicle undercarriage component 18, 20 with a sensor 12, 13, 14 comprising infrared sensing elements 29, each of the elements 29 scanning regions of a target area of the rail vehicle undercarriage component 18, 20 to generate respective scanning waveform signature data corresponding to each region, the sensor being oriented so that at least one of the elements 29 receives unobstructed infrared emissions from the rail vehicle undercarriage component 18, 20, processing the scanning waveform signature data by a processor 40 in communication with the sensor 12, 13, 14 and a memory 42 with respect to the characteristic waveform signature data stored in memory to identify the type of the rail vehicle undercarriage component being scanned and to extract information indicative of a condition of the rail vehicle undercarriage component 18, 20 being identified characterised in that the rail vehicle undercarriage component 18, 20 is scanned from positions corresponding to sensing elements 29 arranged in a plurality of arrays.

Based on the foregoing description, methods as described in US20060131464 may be implemented using computer programming or engineering techniques including computer software, firmware, hardware or any combination or subset thereof, wherein the technical effect may be to determine a condition of a rail vehicle undercarriage component exhibiting a scanned waveform signature corresponding to a type of the component in response to being scanned by a sensor.

The skilled person would realise that foregoing embodiments may be modified to obtain the detector 10 of the present disclosure.

INDUSTRIAL APPLICABILITY

This disclosure describes a detector 10 which may be used to obtain data, such as infrared (IR) emission data. The data may be obtained by sensing a wheel or a wheel bearing as vehicle, such as a rail car, passes over the detector. The data obtained may be indicative of a temperature of the railcar wheel or the wheel bearing. The detector may include a sensing device oriented to receive unobstructed IR emissions from rail car undercarriage components. The detector may include a plurality of sensing device oriented to receive unobstructed IR emissions from rail car undercarriage components.

In an embodiment, the sensor may include a matrix of sensing elements sensing adjacent regions of a target area of a component, such as an inner bearing and an outer bearing of an axle, respectively. The data received from the sensing device may be processed to extract information indicative of a condition of the respective sensed component. The data may be processed to recognize a characteristic waveform profile corresponding to a known component type and to reduce spurious IR emissions received from IR sources in the vicinity of a sensed component.

A suspension for the detector mounted within a railroad tie, or sleeper, may be provided to reduce the effects of shock and vibration that may be experienced due to the passing rail car. Waveform analysis methods may be used to identify a type of component from the data. Upon identification of the type of component being scanned the conditions of the scanned component may be identified which may be indicative of an abnormal condition.

The industrial applicability of the detector 10 as described herein will have been readily appreciated from the following discussion.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

Where technical features mentioned in any claim are followed by references signs, the reference signs have been included for the sole purpose of increasing the intelligibility of the claims and accordingly, neither the reference signs nor their absence have any limiting effect on the technical features as described above or on the scope of any claim elements.

One skilled in the art will realise the disclosure may be embodied in other specific forms without departing from the disclosure or essential characteristics thereof. The foregoing embodiments are therefore to be considered in all respects illustrative rather than limiting of the disclosure described herein. Scope of the invention is thus indicated by the appended claims, rather than the foregoing description, and all changes that come within the meaning and range of equivalence of the claims are therefore intended to be embraced therein.

The invention claimed is:

1. A detector for detecting a condition of a rail vehicle undercarriage component comprising:
a sensor having infrared sensing elements, each of the elements configured to scan regions of a target area of the rail vehicle undercarriage component, the sensor being oriented so that at least one of the elements receives unobstructed infrared emissions from the rail vehicle undercarriage component,
wherein the sensing elements are arranged in a matrix of a plurality of arrays, and wherein a first array of first sensing elements includes the first sensing elements arranged in a first straight line to scan a first portion of the rail vehicle undercarriage component along a perimetric segment of the rail vehicle undercarriage component, and a second array of second sensing elements includes the second sensing elements arranged in a second straight line that is parallel to the first straight line to scan a second portion of the rail vehicle undercarriage component that is at a different point along the perimetric segment of the rail vehicle undercarriage component to provide redundancy in the detection of the condition.

2. The detector of claim 1 wherein the elements scan different regions of a target area of the rail vehicle undercarriage component.

3. The detector of claim 1 wherein the first array and the second array are arranged in a complete overlap and the first straight line and the second straight line are transverse to the direction of travel of a rail vehicle.

4. The detector of claim 1 wherein the first array and the second array are arranged in a partial overlap and the first straight line and the second straight line are transverse to a direction of travel of a rail vehicle.

5. The detector of claim 4 wherein an overall length of the arrays in the matrix is in a range from 700 mm to 800 mm.

6. The detector of claim 4 wherein a length of the overlap between the arrays is in a range from 250 mm to 350 mm.

7. The detector of claim 1 wherein the first array and the second array are staggered transverse to a direction of travel of a rail vehicle.

8. The detector of claim 1 wherein at least a portion of the sensing elements are located in close proximity to each other, and are configured to scan the same regions of a target area of the rail vehicle undercarriage component.

9. The detector of claim 1 wherein the matrix includes four first sensing elements in the first array and four second sensing elements in the second array.

10. A method for detecting a condition of a rail vehicle undercarriage component comprising the steps of:
scanning the rail vehicle undercarriage component with a sensor having infrared sensing elements, each of the elements scanning regions of a target area of the rail vehicle undercarriage component,
wherein the rail vehicle undercarriage component is scanned from positions corresponding to sensing elements arranged in a matrix of a plurality of arrays, and wherein a first array of first sensing elements includes the first sensing elements arranged in a first straight line to scan a first portion of the rail vehicle undercarriage component along a perimetric segment of the rail vehicle undercarriage component, and a second array of second sensing elements includes the second sensing elements arranged in a second straight line that is parallel to the first straight line to scan a second portion of the rail vehicle undercarriage component that is at a different point along the perimetric segment of the rail vehicle undercarriage component to provide redundancy in the detection of the condition.

11. The method of claim 10 including the step of scanning the rail vehicle undercarriage component at different regions of a target area.

12. The method of claim 10 including the step of scanning the rail vehicle undercarriage component from positions corresponding to the first array and the second array being arranged in a complete overlap, the first straight line and the second straight line being transverse to a direction of travel of a rail vehicle.

13. A method for detecting a condition of a rail vehicle undercarriage component comprising the steps of:

scanning the rail vehicle undercarriage component with a sensor having infrared sensing elements, each of the elements scanning regions of a target area of the rail vehicle undercarriage component, wherein the rail vehicle undercarriage component is scanned from positions corresponding to sensing elements arranged in a matrix of a plurality of arrays, and wherein a first array of first sensing elements includes the first sensing elements arranged in a first straight line and a second array of second sensing elements includes the first sensing elements arranged in a second straight line that is parallel to the first straight line; and scanning the rail vehicle undercarriage component from positions corresponding to the first array and the second array being arranged in a partial overlap, the first straight line and the second straight line being transverse to a direction of travel of a rail vehicle.

14. The method of claim 10 including the step of scanning the rail vehicle undercarriage component at substantially the same regions in a target area.

15. The method of claim 10 including the step of scanning the rail vehicle undercarriage component from positions corresponding to sensing elements arranged in two arrays.

16. The detector of claim 1 wherein the first sensing elements of the first array detect first infrared (IR) emissions radiated from the first portion along the perimetric segment of the rail vehicle undercarriage component, and the second sensing elements of the second array detect second IR emissions radiated from the second portion along the perimetric segment of the rail vehicle undercarriage component.

17. The method of claim 10 comprising:

detecting first infrared (IR) emissions radiated from the first portion along the perimetric segment of the rail vehicle undercarriage component at the first sensing elements of the first array; and detecting second IR emissions radiated from the second portion along the perimetric segment of the rail vehicle undercarriage component at the second sensing elements of the second array.

* * * * *